United States Patent [19]

Green et al.

[11] Patent Number: 5,527,437
[45] Date of Patent: Jun. 18, 1996

[54] SELECTIVE TWO-COLOR RESONANT IONIZATION OF ZIRCONIUM-91

[75] Inventors: Lawrence W. Green; Fred C. Sopchyshyn, both of Deep River, Canada

[73] Assignee: Atomic Energy of Canada Limited/Energie Atomique du Canada Limitee, Ottawa, Canada

[21] Appl. No.: 293,071

[22] Filed: Aug. 19, 1994

[51] Int. Cl.⁶ .................................................. B01D 5/00
[52] U.S. Cl. ........................... 204/157.22; 423/DIG. 7
[58] Field of Search ................ 204/157.22; 423/DIG. 7

[56] References Cited

U.S. PATENT DOCUMENTS

| | | | |
|---|---|---|---|
| 4,140,978 | 2/1979 | Bischel et al. | 331/94.55 |
| 4,351,707 | 9/1982 | Turro | 204/158 R |
| 4,490,225 | 12/1984 | Lahoda et al. | 204/158 R |
| 4,567,025 | 1/1986 | Peterson et al. | 204/157.2 |
| 4,584,072 | 4/1986 | Arisawa et al. | 204/157.22 |
| 4,584,073 | 4/1986 | Lahoda et al. | 204/157.2 |
| 4,612,097 | 9/1986 | Jackovitz et al. | 204/157.2 |
| 4,690,742 | 9/1987 | Cantrell et al. | 204/157.2 |
| 4,704,197 | 11/1987 | Trajmar | 204/157.22 |
| 4,767,513 | 8/1988 | Peterson et al. | 204/157.21 |
| 4,793,907 | 12/1988 | Paisner et al. | 204/157.22 |
| 5,202,005 | 4/1993 | Paisner et al. | 204/157.22 |
| 5,316,635 | 5/1994 | Green et al. | 295/157.22 |
| 5,376,246 | 12/1994 | Page | 204/157.22 |

FOREIGN PATENT DOCUMENTS

| | | | |
|---|---|---|---|
| 974190 | 9/1975 | Canada | 204/91.82 |
| 991119 | 6/1976 | Canada | 204/91.82 |
| 994009 | 7/1976 | Canada | 358/9 |
| 1015692 | 8/1977 | Canada | 204/91.82 |
| 1024468 | 1/1978 | Canada | 204/91.82 |
| 1027516 | 3/1978 | Canada | 204/91.82 |
| 1033317 | 6/1978 | Canada | 204/91.82 |
| 1044640 | 12/1978 | Canada | 204/91.8 |
| 1045581 | 1/1979 | Canada | 204/91.8 |
| 1061476 | 8/1979 | Canada | 358/9 |
| 1067452 | 12/1979 | Canada | 204/91.8 |
| 1082128 | 7/1980 | Canada | 204/91.8 |
| 1085343 | 9/1980 | Canada | 204/91.8 |
| 1107232 | 8/1981 | Canada | 204/91.8 |
| 1119123 | 3/1982 | Canada | 204/91.8 |
| 1173054 | 8/1984 | Canada | 260/426.5 |

OTHER PUBLICATIONS

Inst. Phys. Conf. Ser. No. 114:Section 2, Paper presented at RIS 90, Varese, Italy, Sep. 1990, pp. 113–116.
Inst. Phys. Conf. Ser. No. 114:Section 5, Paper presented at RIS 90, Varese, Italy, Sep. 1990, pp. 243–246.
The Americal Physical Society, vol. 42, No. 1, Jul. 1990, pp. 543–549.
J. Phys. B:At. Mol. Opt. Phys., 23, pp. 2945–2956 (1990).
Physical Review A, vol. 40, No. 4, Aug. 15, 1989, pp. 2199–2202.
Inst. Phys. Conf. Ser. No. 94:Section 1, Paper presented at RIS 88, Gaithersburg, Md. Apr. 1988, pp. 41–47.

*Primary Examiner*—Ngoclan Mai
*Attorney, Agent, or Firm*—Sughrue, Mion, Zinn, Macpeak & Seas

[57] ABSTRACT

A method for selectively photoionizing odd mass Zr atoms. Atomic vapours are subjected to two resonant laser pulses to raise the energy of Zr atoms from the J=2 ground state, to a J=1 first intermediate state and to a second intermediate state prior to ionization. Quantum mechanical selection rules applicable to linearly polarized light and hyperfine interactions are exploited to produce odd mass selectivity.

11 Claims, 7 Drawing Sheets

Zirconium

SELECTIVE TWO-COLOR RESONANT IONIZATION OF ZIRCONIUM-91

BACKGROUND OF THE INVENTION

Zirconium is commonly used for forming fuel cladding, pressure tubing and other components of nuclear reactors. Zirconium is useful for such applications because of its relatively low neutron capture cross-section. The neutron capture cross-section of natural zirconium is dominated by the $^{91}$Zr isotope. The fuel economy of a nuclear reactor can be greatly improved by using $^{91}$Zr depleted zirconium in place of natural zirconium. Reduction of $^{91}$Zr in natural zirconium, containing typical alloying impurities, from its natural abundance of about 11% to 3% corresponds to a reduction in effective cross-section from 0.244 barns to 0.15 barns. Further reduction of $^{91}$Zr to 1% corresponds to a reduction in effective cross-section to 0.12 barns. The use of $^{91}$Zr depleted zirconium not only allows improved fuel efficiency, but also allows the use of thicker pressure and calandria tubes reducing tube sag and increasing safety margins. As a result, a substantial saving in the costs of retubing reactors can be realized.

Techniques exist for isotopically selective excitation and ionization of various elements. Enrichment of the uranium isotope, $^{235}$U, for nuclear power plant fuel can be achieved by atomic vapour laser isotope separation (U-AVLIS). In the U-AVLIS process, uranium metal is heated to over 2000° C. to form dense atomic vapours. Dye laser beams, tuned to excite preferentially and ionize the $^{235}$U isotope, are passed through the atomic vapours. The ions, enriched in $^{235}$U are electrostatically separated from the depleted neutrals and collected. The isotopic selectivity obtained in the U-AVLIS process is very high, e.g.> $10^4$, because the spectral shifts between the $^{235}$U and $^{238}$U isotopes are much larger than the laser bandwidths. The lasers are precisely tuned to the frequency of the $^{235}$U transition to excite selectively and ionize this isotope. This approach is not practical for Zr because the isotope shifts are much smaller than the bandwidths of the lasers typically used for U-AVLIS. While lasers of sufficient resolution are available, they are characterized by very low power and hence produce unacceptably low yields for a practical $^{91}$Zr depletion process.

As a result, techniques for $^{91}$Zr depletion that do not depend on isotope shift discrimination have been proposed. U.S. Pat. No. 4,389,292, Phillips et al. issued Jun. 21, 1983 discloses a photochemical process for separating $^{91}$Zr by raising a zirconium chelate ligand from a ground state to an activated state in the presence of a scavenger which reacts with the ligand in the activated state but not in the ground state and separating out the reacted ligand. U.S. Pat. No. 4,584,073, Lahoda et al. issued Apr. 22, 1986 discloses a process for separating $^{90}$Zr by coating small bead particles with a zirconium compound such as zirconium tetrachloride and photoexciting said zirconium compound to cause a reaction of one isotope compound thereof with a scavenger gas.

Non-chemical processes for separating odd from even atomic weight isotopes using polarization selection rules are also known. In a paper entitled "Use of Angular-Momentum Selection Rules for Laser Isotope Separation", Appl. Phys. Lett. 29, 411 (1976), Balling and Wright discuss a technique for isotope-selective laser excitation of atoms which exploits the angular-momentum selection rules for the absorption of circularly polarized light. Resolved hyperfine levels are populated by stepwise excitation with two circularly polarized lasers tuned to the appropriate absorption lines. The Balling and Wright technique is stated to be effective for group III atoms and Yb. This technique requires strong hyperfine interaction and resolvable hyperfine levels. For zirconium, which has an atomic ground state of J= 2, weak hyperfine interaction and many unresolvable hyperfine levels, the Bailing and Wright technique will not work efficiently. The ground state is characterized by a population of zirconium diluted over many hyperfine levels, only one of which can be accessed at a time.

In U.S. Pat. No. 4,020,350, Ducas issued Apr. 26, 1977, there is described a method for the selective excitation of odd atomic weight isotopes employing two pulsed lasers having the same handedness of circular polarization. The first laser pulse creates a coherent superposition state in an intermediate level. After the laser pulse is terminated, resonance oscillation due to hyperfine structure causes the population of the odd atomic weight isotope to be redistributed whereas the population of the even atomic weight isotope is not. According to selection rules, a second laser pulse having the same handedness of circular polarization can excite the redistributed odd atomic weight isotopes out of the intermediate state into a high lying level from which the atoms can be ionized. Although the Ducas method is described as being valid for a wide variety of more complex level structures, it is clear that such method applies only for states having relatively low J and I. This is because the Ducas method requires that the time between application of the laser pulses be set at $t=\pi/\Delta\omega$ where $\Delta\omega$ is the characteristic period of the frequency splitting. For zirconium which has a I=5/2 and a J= 2 ground state, there exist a multiplicity $(2J+1)(2I+1)$ of $\Delta\omega$'s which interfere in such a way that there is no single definable $\omega$. The result is that the Ducas method would likely produce unacceptably low separation factors when applied to zirconium.

In a paper entitled "Effect of a Magnetic Field on the Resonant Multistep Selective Photoionization of Gadolinium Isotopes", Optics Communications, Vol. 76, No. 1, Apr. 1, 1990, Guyadec et al. disclose a multistep photoionization process for separating odd and even isotopes of gadolinium. Guyadec et al. selectively photoionizes odd isotopes ($^{155}$Gd, $^{157}$Gd), but requires the use of an autoionizing level. This level is very susceptible to external electric and magnetic fields and Helmholtz coils are required to control the magnetic field. In hostile environments typical of apparatus used to generate atomic vapours for separation, such as in an electron beam furnace, interfering electric and magnetic fields are practically difficult or impossible to control. Such fields redistribute the sublevel populations in the even isotope and destroy selectivity.

In a paper entitled "Selective ionization of Ba and Sr isotopes based on a two photon interference effect", Physical Review A, Vol. 42, No. 1, Jul. 1, 1990, Park and Diebold disclose the selective ionization of nonzero-spin atoms relative to zero-spin atoms. Park and Diebold use a one-colour two-photon resonant sequence stated to be effective for separating Ba and Sr isotopes. J=0 initial and final states are required.

In U.S. Pat. No. 5,316,635 issued May 31, 1994, there is described a method for selectively photoionizing odd mass Zr atoms in a vapour comprising even and odd mass Zr atoms. The method utilizes three resonant and one non-resonant photons to photoionize selectively the odd mass Zr atoms in a vapour comprising even and odd mass Zr atoms. The method uses quantum mechanical selection rules applicable to linearly polarized light to prepare an intermediate state which includes a magnetic sublevel in which the even mass Zr atoms are substantially unrepresented and hyperfine interactions to establish a substantially isotropic distribution of odd mass Zr atoms in the magnetic sublevels of the intermediate state. Quantum mechanical selection rules are exploited to prevent further excitation of the even isotope. The odd mass Zr atoms are excited out of the intermediate state and ionized.

SUMMARY OF THE INVENTION

It is an object of the present invention to provide a method for selectively photoionizing odd mass Zr atoms in a vapour comprising even and odd mass Zr atoms using a three photon interference effect.

It is a further object of the present invention to provide a method for enhancing selectivity of odd mass Zr atom photoionization.

The method of the invention uses a three photon interference effect to obtain isotopic selectivity. Atomic zirconium is excited from its J=2 ground state to a J=1 intermediate state by a first resonant photon and is coupled by a temporally overlapped two-photon resonance to a newly identified high lying J=0 state using linearly polarized dye lasers. The photoexcitation rate of even mass Zr isotopes exhibits a $\sin^2\emptyset$ dependence on the polarization angle between the laser delivering the first resonant photon and the laser delivering the two-photon transition. However, excitation of the odd mass Zr atoms will occur at all polarizations, in view of hyperfine coupling in the two photon transition. Accordingly, high isotopic selectivity is achieved when the laser polarizations are parallel and pure with respect to non-linear components. Thus, in accordance with the present invention, high isotopic selectivity is achieved using only two lasers, as opposed to the four lasers required in the method disclosed in U.S. Pat. No. 5,316,635.

According to one aspect of the present invention, there is provided a method for selectively photoionizing odd mass Zr atoms in a vapour comprising odd and even mass Zr atoms, comprising the steps of irradiating said vapour with a linearly polarized resonant first laser pulse at a wavelength effective to raise the energy of Zr atoms from the J= 2 ground state to a J=1 intermediate state, irradiating said vapour with a linearly polarized resonant second laser pulse having an energy sufficient to induce in the odd mass zirconium atoms a two-photon energy transition from said J= 1 first intermediate state to said J=0 second intermediate state, said second laser pulse being temporally overlapped with the first laser pulse and having an axis of polarization parallel the first laser pulse such that transition of the even mass zirconium isotopes from said J=2 ground state to said J=0 second intermediate state is substantially forbidden, and ionizing said odd mass isotopes from said J=0 second intermediate state.

In accordance with a preferred embodiment, the J=1 first intermediate state is at 17429.86 cm$^{-1}$ and the J= 0 second intermediate state is at 52020.96 cm$^{-1}$, the axis of polarization of said second laser pulse is substantially parallel to that of said first laser pulse, the first and second laser pulses are delivered simultaneously, and the energy of said second laser pulse, either alone or in combination with said first laser pulse is sufficient to induce said ionization.

BRIEF DESCRIPTION OF THE DRAWINGS

These and other features of the present invention are more fully set forth below in the accompanying detailed description, presented solely for purposes of exemplification and not by way of limitation, and in the accompanying drawings, of which.

DETAILED DESCRIPTION OF THE INVENTION

Figure 1:
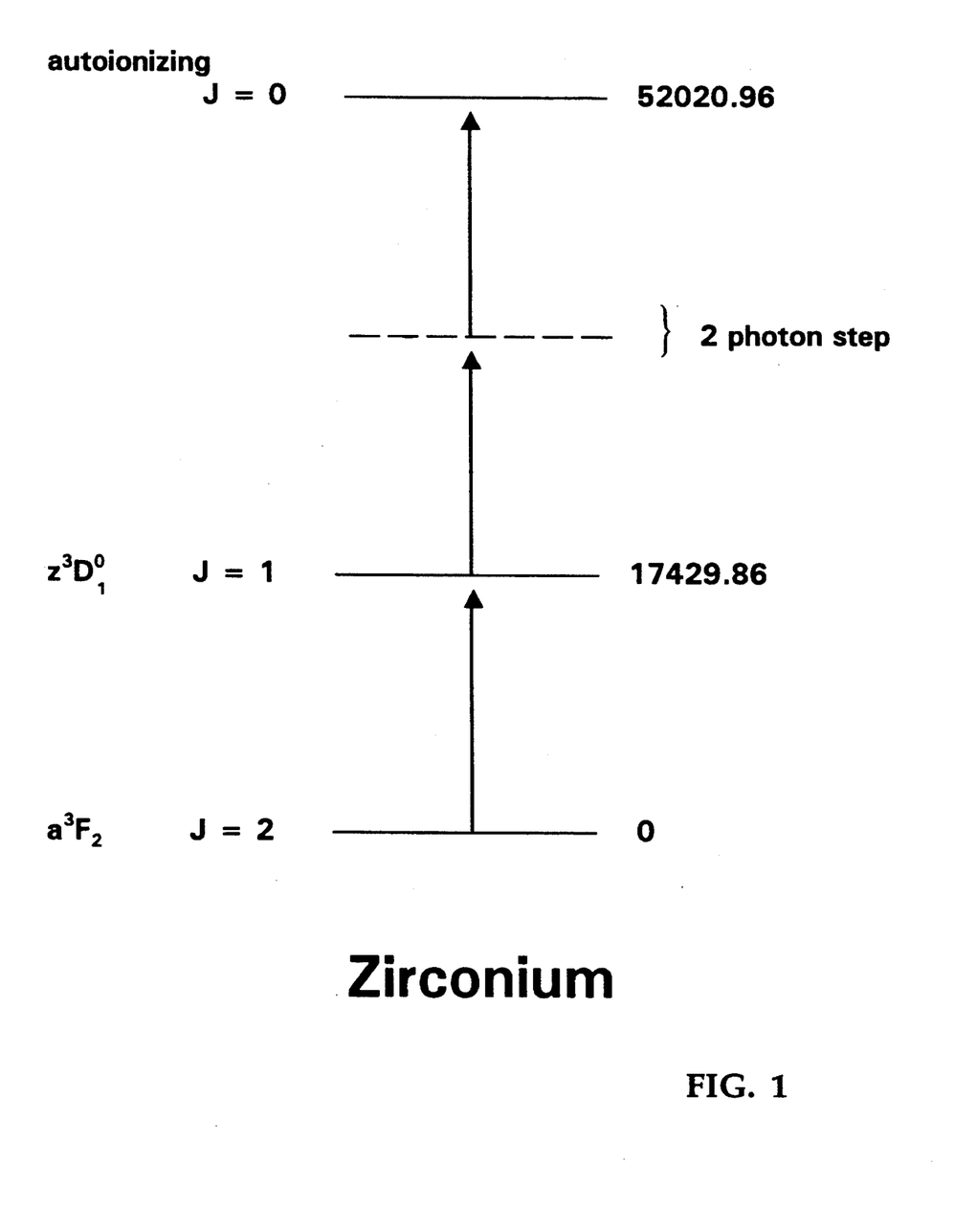
FIG. 1 is an energy level and transition diagram of an excitation path of the present invention.

FIG. 1 shows exemplary energy states employed in achieving selective photoionization of odd mass Zr atoms in accordance with one aspect of the present invention. The ground energy state of zirconium is defined as the zero energy level and has a total electronic angular momentum quantum number of J=2. From the ground level the zirconium atoms are excited to a first intermediate energy state at 17429.86 cm$^{-1}$ by a first resonant photon tuned to 573.7 nm. This first intermediate state has a total electronic angular momentum quantum number of J=1. From this first intermediate state, the zirconium atoms are excited to a high lying second intermediate energy state at 52020.96 cm$^{-1}$ by a two-photon transition tuned to 578.2 nm. Isotopic selection in favour of odd mass Zr atoms occurs in these transitions. From the second intermediate state, non-resonant photoionization of the odd mass Zr through the ionization continuum at 53506 cm$^{-1}$ occurs.

The following theoretical analysis represents a current understanding of the operation of the present invention, but is not intended to limit the scope or validity thereof. The theoretical analysis is directed to the excitation path described in FIG. 1, but those skilled in the art will understand that it applies generally to other excitation paths within the scope of the present invention.

As described by Grynberg in *J. Physique*, 40, 965 (1979), the probability P, for a three-photon transition from lower level g to upper level e is given by the following equation:

$$P_{ge} = \frac{4}{2J_g + I} \sum_{m_g m_e} \frac{|\langle J_e m_e | Q_{eee} | g J_g m_g \rangle|^2}{\hbar^2 \Gamma_e} \left| \frac{E}{2} \right|^6 \quad (I)$$

where $Q_{eee}$ is the three-photon transition operator, T is the lifetime of the state e, and the other terms have their meanings commonly understood by those skilled in the art.

The transition probability may be separated into a part which depends on the atomic wave functions, the reduced matrix elements, and a geometrical term which depends on the angular momentum properties and polarizations as follows:

$$P_{ge} = \frac{4 |3!E_1E_2E_3|^2}{(2J+1)\ {}^2\Gamma_e 2^6} \sum_{k=1,3} \frac{|<eJ_e\|R^k\|gJ_g>|^2}{2k+1} \times \sum_q |a_q^k(\epsilon_1, \epsilon_2, \epsilon_3)|^2 \quad (2)$$

where the E's are the amplitudes of the three electric fields and R is related to the electric dipole operator, as described by G. Grynberg in J. Physique, Vol. 40, p. 965 (1979).

For identical polarizations, the selection rules resulting from equations (I)–(II) forbid J=2 to J=0 and J=1 to J=0 transitions for three and two-photon transitions respectively. If the polarizations are different, these transitions become allowed because of introduction of asymmetrical spherical tensor components and second order perturbation terms. Although the selection rules contemplate that the excitation of atomic zirconium could in theory be controlled by varying relative polarization angles of the resonant lasers, the selection rules do not suggest that they can be applied so as to enable selective excitation of odd mass zirconium isotopes only.

When atomic zirconium is excited by a first resonant photon of appropriate energy, an even isotope can be caused to assume a J=1 state. Excitation of even isotopes is suppressed if a second parallel laser field is present that couples the J=1 state to a J=0 state through a two-photon transition, because of the three-photon interference effect. However, for the odd isotope, hyperfine coupling will create a large number of sublevels and cross-linkages. The resulting hyperfine structure has a total angular momentum quantum number properly described by F and not J. Accordingly, it has been found that the above selection rules do not forbid a three-photon excitation of an odd mass zirconium isotope to a F=5/2, J=0 state.

The invention is based, in part, on the discovery in atomic zirconium, of a J=0 high lying state at 52020.96 cm$^{-1}$ coupled by a two-photon resonance to the J=1 intermediate state at 17429.86 cm$^{-1}$ using linearly polarized lasers. For the excitation path in accordance with the present invention, Equation (II) above predicts a sin$^2$Ø dependence of the photoionization rate on the polarization angle between the two lasers. When the polarizations of the lasers are parallel and time overlapped, no excitation of $^{90}$Zr from the J=2 ground state to the high lying J=0 intermediate state will occur. However, excitation of $^{91}$Zr will occur at all polarizations, provided that the hyperfine coupling is sufficiently strong to create many sublevels and linkages.

The first intermediate state at 17429.86 cm$^{-1}$ is a known J=1 state for zirconium as described in Atomic Energy Levels, C. E. Moore, Circular of the National Bureau of Standards, No. 467, 1949. A series of resonant transitions were discovered in atomic zirconium by scanning a dye laser in the 566 to 590 nm spectral range and assigning energies by the method described by Smyth et al., *J. Phys. B* 24, 1991, pp. 4887–4900. Table 1 lists eighty nine high lying states that were discovered.

TABLE I

| $\lambda_2$ | $\lambda_1 + 2\lambda_2$ | $\lambda_2$ | $\lambda_1 + 2\lambda_2$ |
|---|---|---|---|
| 17010.71 | 51451.28 | 17362.13 | 52154.12 |
| 17024.19 | 51478.24 | 17363.85 | 52157.56 |

TABLE I-continued

| $\lambda_2$ | $\lambda_1 + 2\lambda_2$ | $\lambda_2$ | $\lambda_1 + 2\lambda_2$ |
|---|---|---|---|
| 17028.53 | 51486.93 | 17365.29 | 52161.24 |
| 17028.77 | 51487.4 | 17366.30 | 52162.46 |
| 17029.80 | 51489.46 | 17370.19 | 52170.24 |
| 17038.23 | 51506.32 | 17372.03 | 52198.62 |
| 17041.90 | 51513.66 | 17374.34 | 34748.68* |
| 17073.32 | 51576.5 | 17384.38 | 52198.62 |
| 17074.02 | 51577.9 | 17391.96 | 52213.78 |
| 17079.60 | 51589.06 | 17408.28 | 34816.56* |
| 17088.90 | 51607.66 | 17420.53 | 52270.92 |
| 17089.85 | 51609.56 | 17421.19 | 52272.25 |
| 17106.46 | 51642.79 | 17427.74 | 52285.34 |
| 17109.49 | 51648.84 | 17428.44 | 52286.74 |
| 17121.03 | 51671.92 | 17435.90 | 34871.8 |
| 17127.29 | 51694.44 | 17450.65 | 52331.16 |
| 17134.40 | 51698.66 | 17455.01 | 52339.88 |
| 17148.12 | 51726.1 | 17469.74 | 52369.34 |
| 17149.73 | 51729.32 | 17471.98 | 52373.82 |
| 17154.12 | 51738.1 | 17476.12 | 52382.22 |
| 17175.92 | 51781.7 | 17485.73 | 52401.32 |
| 17192.78 | 34385.56* | 17495.39 | 52420.64 |
| 17219.60 | 34439.20* | 17504.72 | 52439.3 |
| 17230.22 | 51890.3 | 17515.93 | 52461.72 |
| 17231.13 | 51892.11 | 17576.89 | 52488.64 |
| 17239.43 | 34478.86* | 17541.51 | 52512.88 |
| 17241.16 | 51912.18 | 17541.74 | 52513.34 |
| 17263.68 | 34527.36* | 17544.27 | 52518.4 |
| 17237.28 | 34474.56* | 17545.42 | 52520.70 |
| 17232.42 | 34464.84* | 17549.66 | 52529.18 |
| 17270.16 | 34540.32* | 17551.76 | 52533.38 |
| 17287.16 | 52004.18 | 17554.47 | 52538.80 |
| 17288.36 | 52006.58 | 17565.13 | 52560.12 |
| 17289.06 | 52007.98 | 17566.84 | 52563.54 |
| 17292.12 | 34584.24* | 17567.68 | 52565.22 |
| 17294.30 | 52018.46 | 17595.82 | 52621.50 |
| 17295.55 | 52020.96 | 17606.51 | 52642.88 |
| 17341.89 | 52113.64 | 17611.71 | 52653.28 |
| 17342.94 | 52115.74 | 17622.95 | 52675.76 |
| 17345.60 | 34691.20* | 17627.18 | 52684.22 |
| 17350.41 | 34700.82* | 17624.46 | 52678.78 |
| 17352.61 | 52135.08 | 17648.96 | 52727.78 |
| 17356.75 | 52143.36 | 17661.04 | 52751.94 |
| 17358.8 | 52147.46 | 17662.71 | 52755.28 |
| 17360.19 | 52150.24 | | |

*One colour, $2\lambda_2$

The transitions identified in Table 1 by an asterisk are one-colour transitions. The others are two-colour transitions, with the first step set to 17429.86 cm$^{-1}$, being the transition from the a$^3$F$_2$ ground state to the z$^3$D$^0_1$ first intermediate state.

The transition at 17295.5 cm$^{-1}$ was determined to be a J=0 state using the following experimental set-up. Zirconium atomic vapours were generated by an electron beam furnace mounted below the photoionization region of a 5 m time-of-flight mass spectrometer and shielded with copper and mu-metal, except for a 1×7 mm vapour exit slit. The resolution (m/Δm) of the mass spectrometer for Zr was typically 500.

Two Lumonics Model Hyperdye 300 tunable dye lasers were used, one pumped by an Oxford Model CU 40 copper vapour laser and the other by an 8 watt copper vapour laser. The dye lasers were charged with rhodamine 590 dye, and delivered pulse energies of about 4 uJ over bandwidths (FWHM) of about 0.05 cm$^{-1}$. Laser pulses were about 10–20 ns in duration. A Stanford Research Systems digital generator was used to control and synchronize the copper vapour lasers.

The dye circulation was modified to provide a high flow rate of about 7 L/min with minimal vibrations. A 3.7 L stainless steel reservoir was installed in the flow lines, one on each side of the pump. All flow lines were made from 0.5 in o.d. teflon tubing and the dye laser oscillator cells were bored out to allow unrestricted flow of the dye through the dye cell walls. The resultant dye flow was very smooth and bubble free as well as being fast enough for copper vapour laser pumping. The dye was water cooled to avoid rapid degradation. With careful alignment of the lasers, bandwidths of 0.04 cm$^{-1}$ were obtained with excellent line stability. The laser beams were linearly polarized and the plane of polarization rotated using $\lambda/2$ birefringent plates. The laser beams were focussed to about 0.1 mm diameter in the ion source and the photoionization zone was estimated to be about 4 mm in length.

Laser induced fluorescence (LIF) spectra of $I_2$ were recorded for wavelength calibration and selection. The LIF signals were generated by directing 5% of the laser beam to a cell which contained 0.2 torr of $I_2$ and which was equipped with a Hamamatsu R106 photomultiplier detector. Iodine LIF and Zr resonance ionization spectra were monitored with a Stanford Research Systems SR 250 boxcar averager and stored. Both types of spectra were useful for precisely setting the laser wavelengths to the transitions used.

Photoionization signals were recorded by a fast Galileo Model FTD 2003 detector in the pulse counting mode. A multi-channel gated pulse counting system was used for simultaneous counting of mass 90, 91 and 92 isotopes and for background measurement. Gate widths were set to 200 ns and count durations were set to $10^6$ copper vapour laser pulses to obtain sufficient counting precision. The background was monitored near mass 88. The count totals ranged between 100 and 5000 per isotope.

Figure 2:
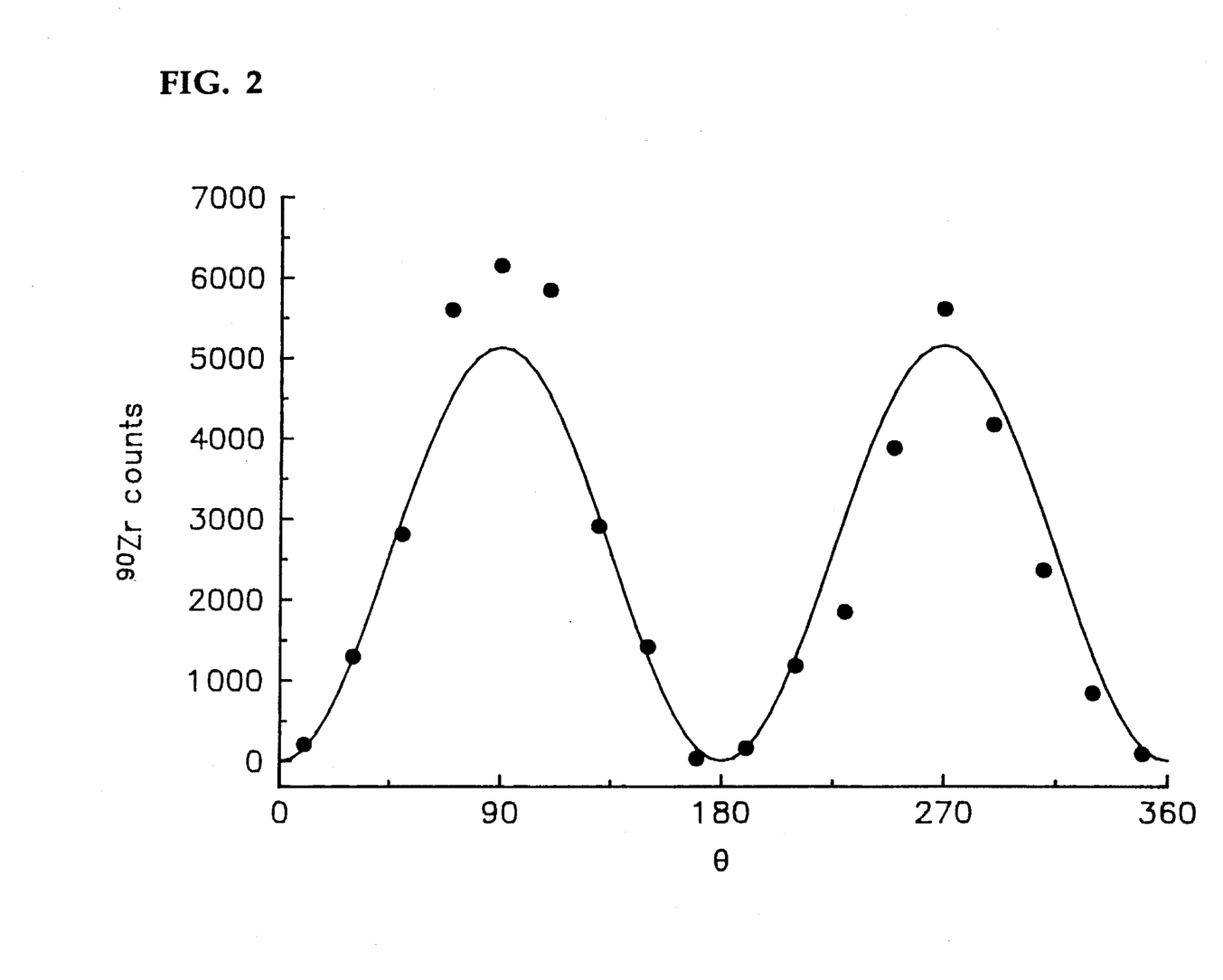
FIG. 2 is a graph of the photo-excitation of $^{90}$Zr plotted as a function of relative linear polarization angle for the excitation path of the present invention using parallel temporally overlapped lasers.

The plotted points in FIG. 2 represent the experimentally measured values of $^{90}$Zr as a function of relative polarization angle when the two laser pulses were temporally overlapped. The experimental results show a $\sin^2\emptyset$ curve with heavy suppression of the $^{90}$Zr signals at parallel laser polarizations (0° and 180°). The observed functional dependence on relative polarization angle agrees with that predicted by Equation (II) for a J=0 state.

In order to establish that the transition from the J=1 first intermediate state at 17429.86 cm$^{-1}$ to the J=0 high lying state at 52020.96 cm$^{-1}$ is a two-photon resonant transition, the second laser pulse energy was variably attenuated and the photoionization signal strength was measured against the second laser pulse energy. The results when the first and second lasers were time resolved yielded curves described by polynomials having exponents between 2 and 3 (FIG. 3), and between 1 and 2 and when the lasers were overlapped in time. These results are indicative of a two photon resonant transition from the J=1 intermediate state at 17429.86 cm$^{-1}$ to the J=0 level at 52020.96 cm$^{-1}$, from which non-resonant photoionization occurs. The reduction in fluence dependence observed when the lasers were time overlapped is attributed to contribution from the first laser to the non-resonant photoionization step. A non-resonant step is expected because the total energy after 2-colour, 3-photon excitation is 52021.0 cm$^{-1}$, which is below the ionization limit of 53,506.0 cm$^{-1}$.

Figure 4:
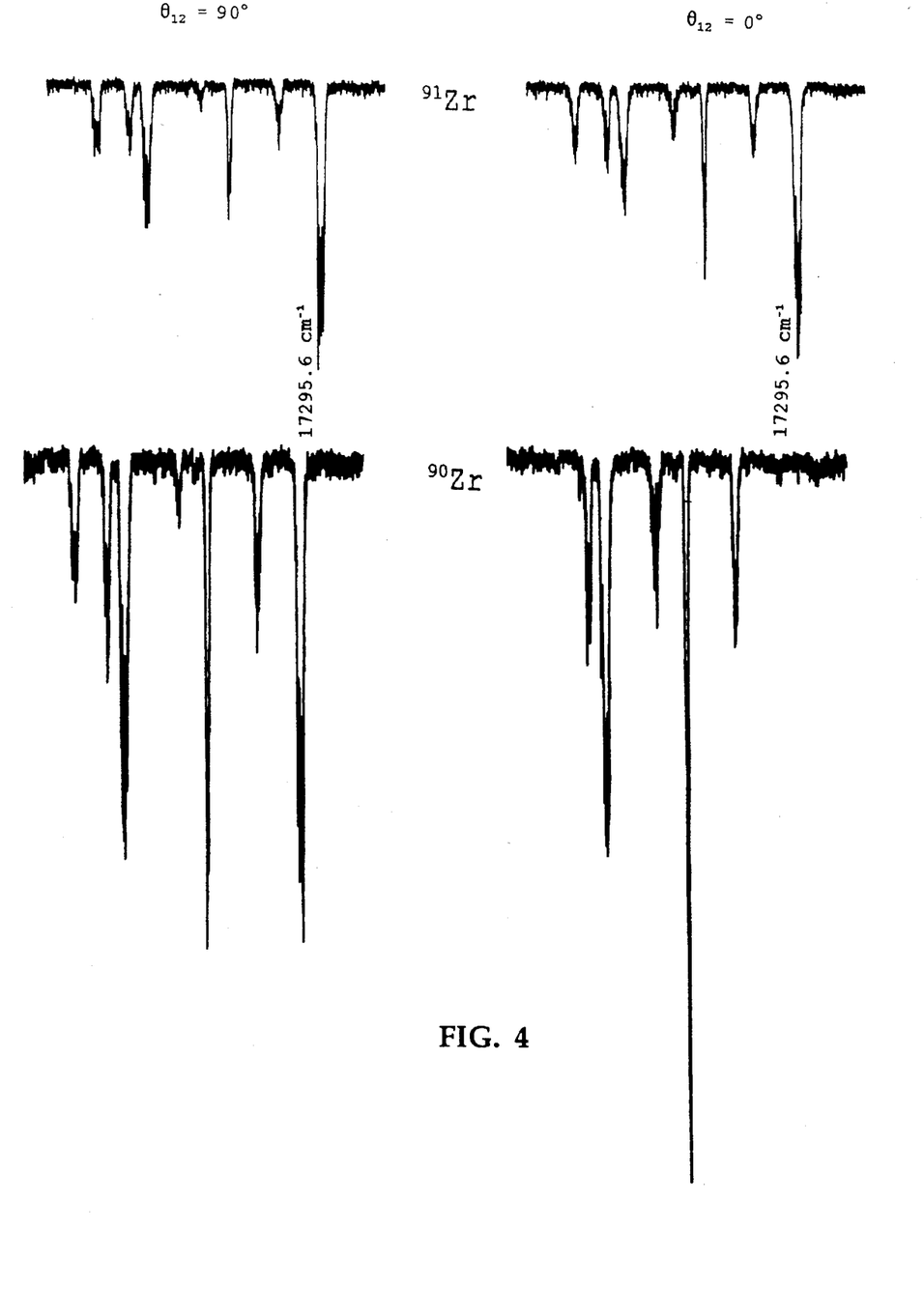
FIG. 4 is a graph of the $^{90}$Zr and $^{91}$Zr photoionization signals according to the excitation path of the present invention with the J=1 first intermediate state set to 17429.86 cm$^{-1}$ and the second laser swept over a wide range of frequencies.

FIG. 4 shows the ionization signals for $^{91}$Zr and $^{90}$Zr with the first laser resonant with the J=1 first intermediate state at 17429.86 cm$^{-1}$ and the parallel temporally overlapped second laser swept over a broad frequency range. The ionization signals where the second transition is at 17295.6 cm$^{-1}$ show substantial isotopic selectivity in favour of $^{91}$Zr.

Figure 5:
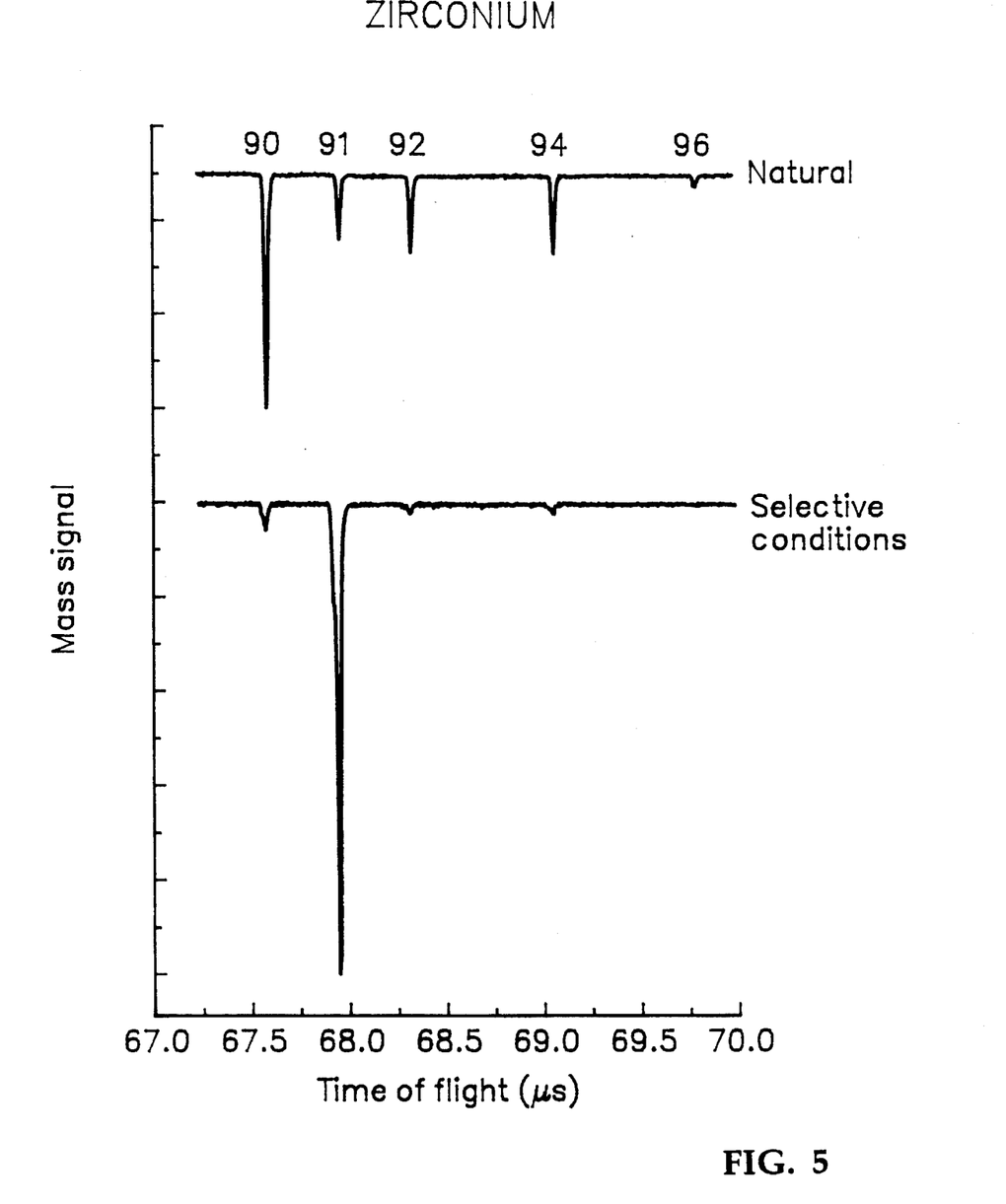
FIG. 5 is a graph of the photoionization signals of natural zirconium as against the excitation path of the present invention where the isotopes have been separated by a time-of-flight mass spectrometer.

FIG. 5 shows for comparative purposes the ionization mass signals for $^{91}$Zr and even mass zirconium isotopes at natural abundance and after two-colour three-photon resonant ionization in accordance with the present invention. The ratio of $^{91}$Zr/$^{90}$Zr after excitation in accordance with the present invention to that of natural zirconium is approximately 80.

Figure 6:
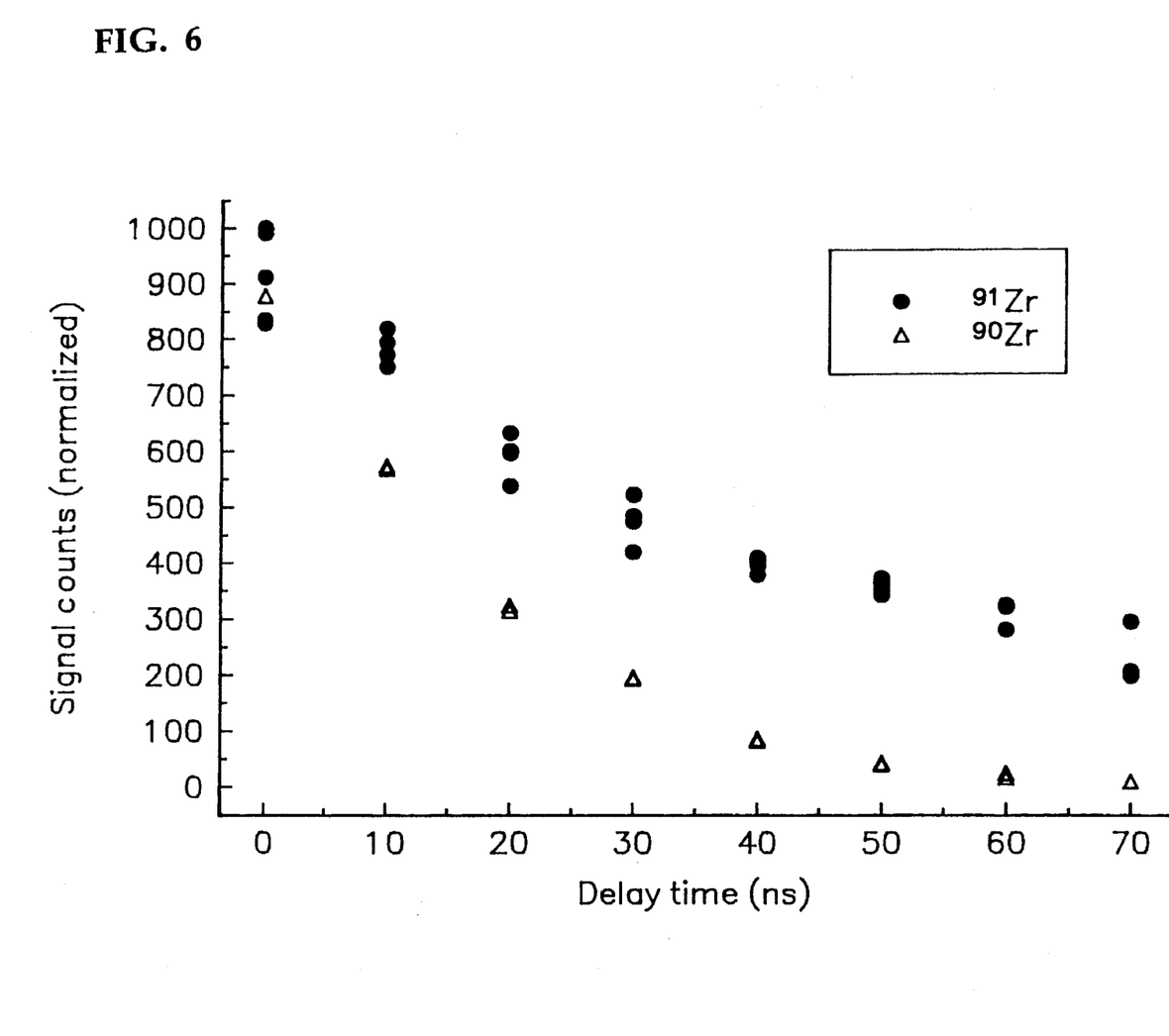
FIG. 6 is a graph of the photoexcitation of $^{90}$Zr and $^{91}$Zr using non-parallel lasers for the excitation path of the present invention plotted as a function of delay time between the initiation of the laser pulses.

It has been found that the polarization dependence of the $^{90}$Zr ionization signal is strongest when the laser pulses are delivered simultaneously, and decreases as the delay time between the pulses is increased and the pulses become no longer temporally overlapped. By "temporally overlapped" it is meant that the second pulse is initiated before the first pulse, including any residual "tailing", has died out. As shown in FIG. 6, for perpendicular polarization, the $^{90}$Zr ionization signal decreased to baseline levels as the delay between the lasers was increased to 30 ns, at which time the pulses were completely separated (although the pulses used were in the order of 15 ns in duration, the 30 ns delay is sufficient to separate the second pulse from any residual tailing of the first). In this instance, the excitation is described as an allowed one photon transition followed by a two-photon transition, for which the geometric term of the probability is:

$$\alpha_q^k(q_1,q_2)=1/2[<kq/11q_1q_2>+<kq|11q_2q_1>] \qquad (III)$$

This predicts a zero transition probability for a J=1 to J=0 two-photon transition; i.e., the transition is forbidden.

Figure 3:
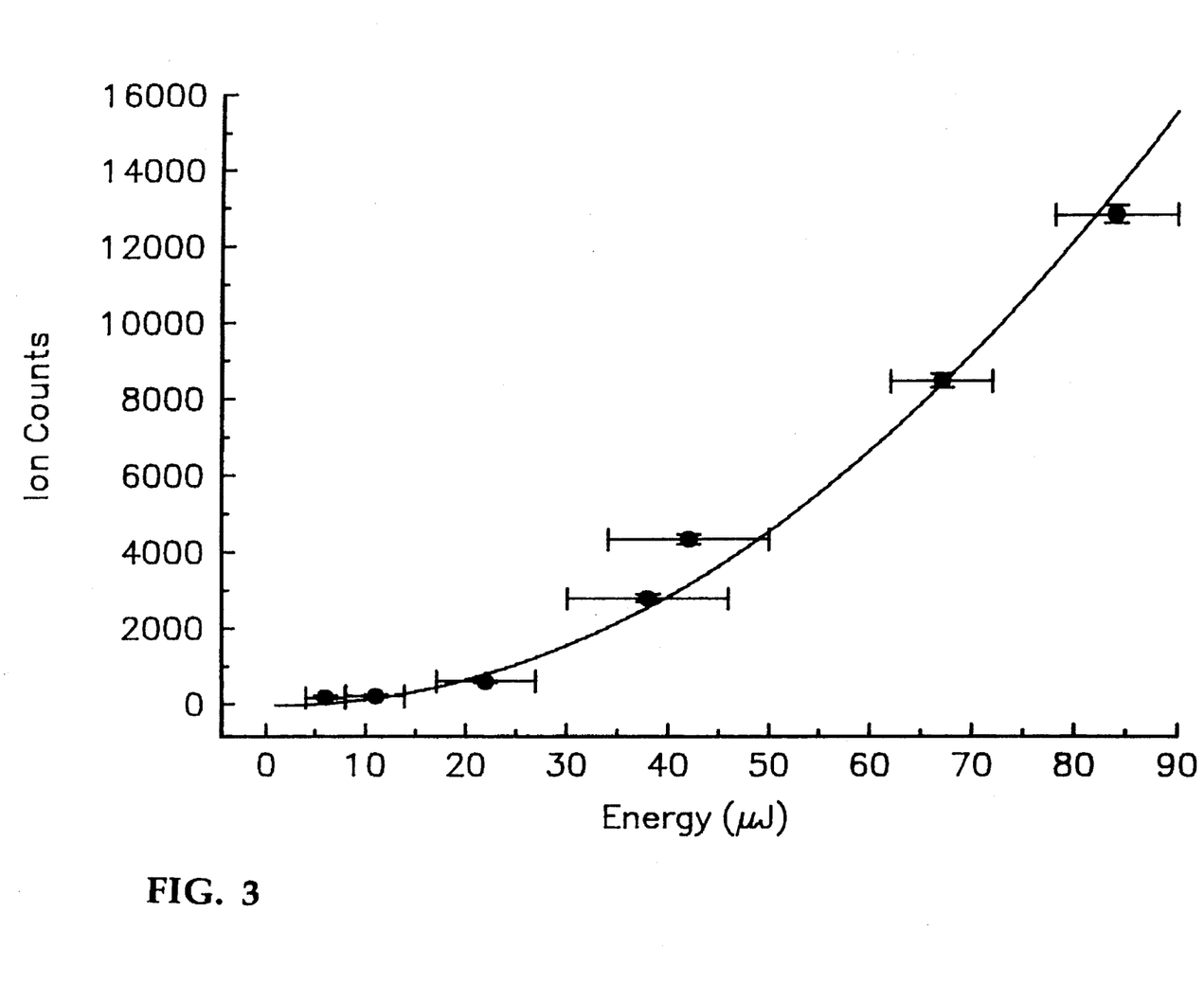
FIG. 3 is a graph of the photoexcitation of $^{91}$Zr for the excitation path of the present invention plotted as a function of the second laser pulse energy.

The results shown in FIG. 6 confirm that for the excitation path of the present invention, the J=1 to J=0 transition is forbidden. The fact that ionization of the $^{91}$Zr isotope occurs whether the lasers are temporally overlapped or separated indicates that the interference effect predicted by Equation (III) is not experienced by the $^{91}$Zr isotope. It is believed that the hyperfine coupling is strong enough to create many additional sublevels and linkages causing the $^{91}$Zr isotope to not experience this interference effect and accordingly to strongly ionize at all polarizations. The decrease in the $^{91}$Zr signal as the delay time is increased to about 30 ns as shown in FIG. 3 is thought to be due to the diminishing contribution to the ionization step from the first laser. The rate of decrease beyond the 30 ns point is much lower and is attributed to decay of the 17429.86 state.

Figure 7:
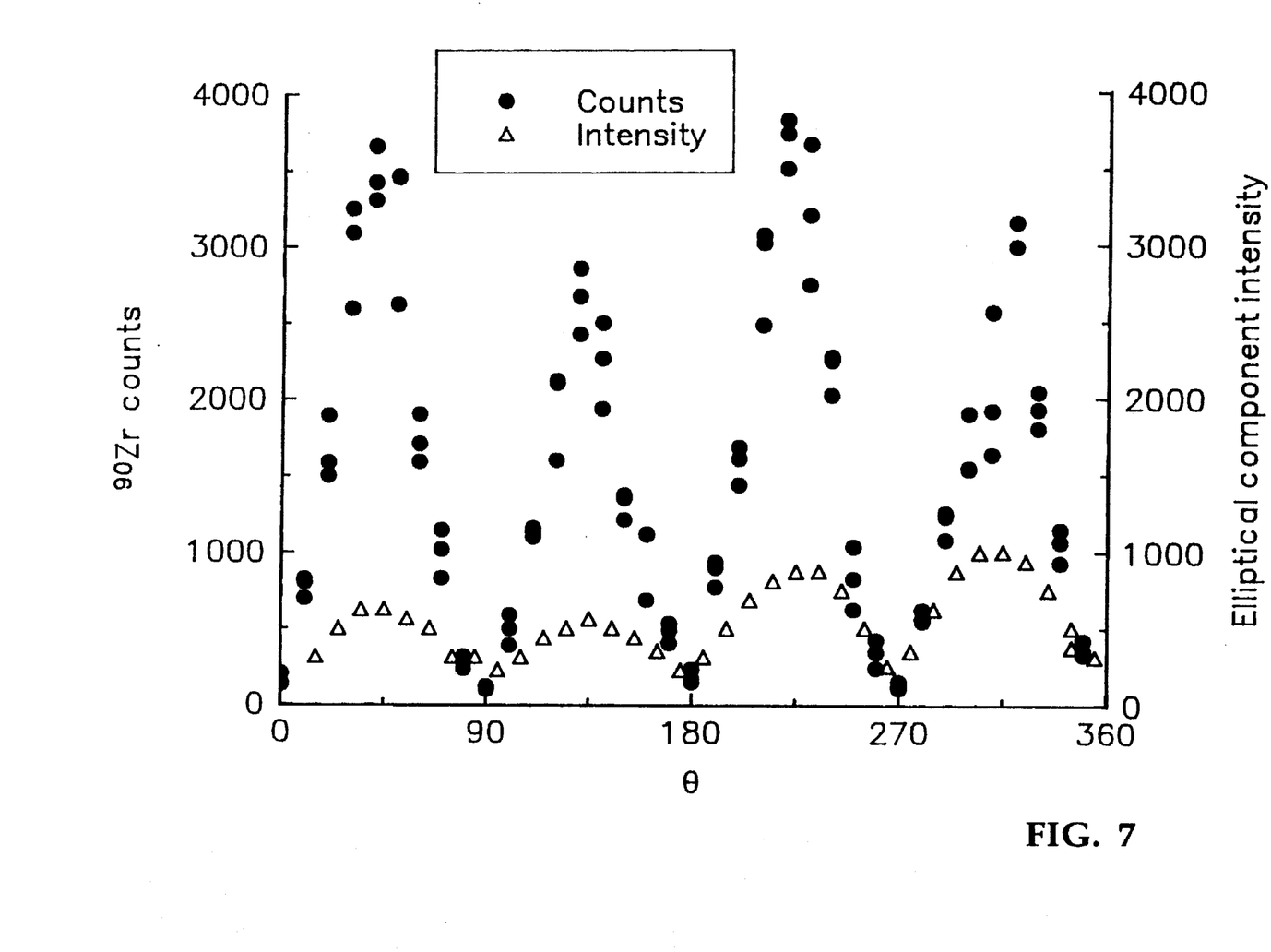
FIG. 7 is a graph of the photoexcitation of $^{90}$Zr using an elliptically polarized second laser for the excitation path of the present invention plotted as a function of rotation angle with 0° being vertical in the reference frame.

As noted above, Equation (III) predicts that the $^{90}$Zr isotope signal will be suppressed when the lasers are temporally resolved. However, consideration of second order perturbation terms as described by F. W. Dalby et. al, Can J. Phys. 62, p. 419 (1984), leads to the prediction of a transition probably dependent on the ellipticity of the laser polarization. This was tested by reflecting the beam off of metaloxide coated mirrors and plotting the $^{90}$Zr isotope signal against the rotation angle. As shown in FIG. 7, the ellipticity was dependent on the rotation angle and the signal strength followed the square of the intensity of the minor axis. Only for linear polarizations in or perpendicular to the plane of incidence does the reflected beam have the same polarization as the incident. In these instances, the degree of ellipticity and the $^{90}$Zr isotope signal are minimal. Accordingly, in order to ensure maximum selectivity, it is desirable that the linearly polarized second laser inducing the two-photon transition not only be parallel to the first laser inducing the first resonant transition, but also have a high degree of polarization purity. This can be achieved by passing the beam through prism polarizers.

Various geometries were tested to confirm that for time overlap conditions, the relative polarization of significance is that between the laser inducing the two-photon resonance and the laser in one photon resonance with the J=1 state. These tests included propagation of the second laser along the x,y and z axes and confirmed that the isotopic selectivity effect was reproducible and was only dependent on the relative polarization between the first and second lasers.

A third laser was introduced to verify that the polarization dependence is not attributable to interference with laser fields or ionization effects.

To implement the process of the present invention, laser sources and ion vapour separating apparatus known in the art may be used, such as those used in known AVLIS processes and described briefly above.

The foregoing description of the preferred embodiments of the invention and theory of operation is provided for purposes of illustration and description and is not intended to limit the invention to the precise embodiments disclosed. It is intended that the scope of the invention be defined by the claims appended hereto.

What is claimed is:

1. A method for selectively photoionizing odd mass Zr atoms in a vapour comprising odd and even mass Zr atoms, comprising the steps of:

irradiating said vapour with a linearly polarized resonant first laser pulse at a wavelength effective to raise the energy of Zr atoms from a J= 2 ground state to a J=1 first intermediate state;

irradiating said vapour with a linearly polarized resonant second laser pulse having an energy sufficient to induce in the odd mass zirconium atoms a two-photon energy transition from said J= 1 first intermediate state to a J=0 second intermediate state, said second laser pulse being temporally overlapped with the first laser pulse and having an axis of polarization parallel to that of the first laser pulse such that transition of the even mass zirconium isotopes from said J=2 ground state to said J=0 second intermediate state is substantially forbidden;

ionizing said odd mass isotopes from said J=0 second intermediate state.

2. The method according to claim 1 wherein the J= 1 first intermediate state is at 17429.86 cm$^{-1}$.

3. The method according to claim 1 wherein the J=0 second intermediate state is at 52020.96 cm$^{-1}$.

4. The method according to claim 1 wherein the J=1 first intermediate state is at 17429.86 cm$^{-1}$ and the J= 0 second intermediate state is at 52020.96 cm$^{-1}$.

5. The method according to claim 1 wherein the axis of polarization of said second laser pulse is substantially parallel to that of said first laser pulse.

6. The method according to claim 1 wherein the first and second laser pulses are delivered simultaneously.

7. The method according to claim 3 wherein each of the first and second and laser pulses has a duration of 10 to 20 ns.

8. The method according to claim 1 wherein the J= 1 first intermediate state is at 17429.86 cm$^{-1}$, the J= 0 second intermediate state is at 52020.96 cm$^{-1}$, the axis of polarization of said second laser pulse is substantially parallel to that of said first laser pulse and the first and second laser pulses are delivered simultaneously.

9. The method according to claim 1 wherein the energy of said second laser pulse, either alone or in combination with said first laser pulse is sufficient to induce said ionization.

10. A method for selectively photoionizing odd mass Zr atoms in a vapour comprising odd and even mass Zr atoms comprising the steps of:

irradiating said vapour with a linearly polarized first laser pulse at a wavelength effective to raise the energy of Zr atoms from the J= 2 ground state to a J= 1 first intermediate state at 17429.86 cm$^{-1}$;

simultaneously irradiating said vapour with a linearly polarized resonant second laser pulse having an energy sufficient to induce in the odd mass zirconium atoms a two-photon energy transition from said J= 1 first intermediate state to said J=0 second intermediate state at 52020.96 cm$^{-1}$, said second laser pulse having an axis of polarization parallel to that of the first laser such that transition of the even mass zirconium isotopes from said J=2 ground state to said J=0 second intermediate state is substantially forbidden;

the intensity of said second laser pulse, either alone or in combination with said first laser pulse being sufficient to ionize said odd mass isotopes.

11. The method according to claim 10 wherein each of the first and second laser pulses has a duration of 10 to 20 ns.

* * * * *